(12) United States Patent
Wolf et al.

(10) Patent No.: US 11,481,297 B2
(45) Date of Patent: Oct. 25, 2022

(54) EVENT INPUT DEVICE TESTING

(71) Applicant: Honeywell International Inc., Charlotte, NC (US)

(72) Inventors: Benjamin H. Wolf, Leicester (GB); Michael Barson, Nuneaton (GB); Christopher Dearden, Melton Mowbray (GB)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 17/141,395

(22) Filed: Jan. 5, 2021

(65) Prior Publication Data

US 2022/0214950 A1 Jul. 7, 2022

(51) Int. Cl.
| | | |
|---|---|---|
| G06F 11/26 | (2006.01) | |
| G08B 5/22 | (2006.01) | |
| G06F 11/22 | (2006.01) | |
| G08B 1/08 | (2006.01) | |
| G05B 15/02 | (2006.01) | |
| G08B 29/18 | (2006.01) | |
| G08B 29/14 | (2006.01) | |
| G08B 29/16 | (2006.01) | |

(52) U.S. Cl.
CPC .......... *G06F 11/26* (2013.01); *G06F 11/2221* (2013.01); *G08B 1/08* (2013.01); *G08B 5/22* (2013.01); *G05B 15/02* (2013.01); *G08B 29/14* (2013.01); *G08B 29/16* (2013.01); *G08B 29/18* (2013.01)

(58) Field of Classification Search
CPC .... G08B 17/10; G08B 29/043; G08B 29/145; G08B 25/14; G08B 29/14; G08B 17/107; G08B 29/20
See application file for complete search history.

(56) References Cited

U.S. PATENT DOCUMENTS

| | | | |
|---|---|---|---|
| 9,552,720 B2 | 1/2017 | Moffa | |
| 9,767,679 B2 | 9/2017 | Piccolo, III et al. | |
| 9,959,748 B2 | 5/2018 | Moffa | |
| 10,074,265 B2 | 9/2018 | Moffa | |
| 2008/0084291 A1* | 4/2008 | Campion | G08B 29/145 340/514 |
| 2012/0286946 A1* | 11/2012 | Karl | G08B 29/126 340/516 |
| 2015/0248832 A1* | 9/2015 | Piccolo, III | G08B 29/145 340/514 |
| 2015/0310732 A1 | 10/2015 | Piccolo, III | |

(Continued)

OTHER PUBLICATIONS

Extended European Search Report for related European Application No. 21218231.5, dated May 31, 2022 (8 pgs).

*Primary Examiner* — Mirza F Alam (74) *Attorney, Agent, or Firm* — Brooks, Cameron & Huebsch, PLLC (57) ABSTRACT

Devices, systems, and methods for event input device testing are described herein. In some examples, one or more embodiments include a controller comprising a memory and a processor to execute instructions stored in the memory to cause a first event input device of a group of event input devices to perform an automated test process, and determine whether a second event input device of the group of event input devices has detected a hazard event while the first event input device is performing the automated test process.

20 Claims, 4 Drawing Sheets

(56) References Cited

U.S. PATENT DOCUMENTS

| | | | |
|---|---|---|---|
| 2016/0343241 A1* | 11/2016 | Rossi | G08B 29/126 |
| 2017/0287319 A1* | 10/2017 | Moffa | G08B 29/145 |
| 2019/0146444 A1 | 5/2019 | Brown et al. | |
| 2021/0065536 A1 | 3/2021 | Dearden et al. | |

* cited by examiner

EVENT INPUT DEVICE TESTING

TECHNICAL FIELD

The present disclosure relates to devices, systems, and methods for event input device testing.

BACKGROUND

Large facilities (e.g., buildings), such as commercial facilities, office buildings, hospitals, and the like, may have an alarm system that can be triggered during an emergency situation (e.g., a fire) to warn occupants to evacuate. For example, an alarm system may include a control panel (e.g., a fire control panel) and a plurality of hazard (e.g., fire) sensing devices located throughout the facility (e.g., on different floors and/or in different rooms of the facility) that can sense a hazard event occurring in the facility and provide a notification of the hazard event to the occupants of the facility via alarms.

Maintaining the alarm system can include regular testing of event input devices. Such regular testing may be mandated by codes of practice in an attempt to ensure that the event input devices are functioning properly.

DETAILED DESCRIPTION

Devices, systems, and methods for event input device testing are described herein. In some examples, one or more embodiments include a controller comprising a memory and a processor to execute instructions stored in the memory to cause a first event input device of a group of event input devices to perform an automated test process, and determine whether a second event input device of the group of event input devices has detected a hazard event while the first event input device is performing the automated test process.

Testing of event input devices can include a first user (e.g., such as a technician, engineer, etc.) walking around the facility and visually checking the alarm system components, typically, at the same time as they carry out functional testing of event input devices and other components of the alarm system. For example, carrying out smoke testing of fire sensors and visual inspection of the fire sensors at the same time the inspector is close enough to visually inspect each fire sensor. While the first user is functionally testing and visually inspecting event input devices, a second user may typically interpret signals received at the alarm system control panel. Such signals can be the result of the first user functionally testing event input devices in the facility.

Such a manual testing process between the second user at the control panel and the first user testing event input devices in the facility may be subject to error. For instance, while the first user may be functionally testing a first event input device, a second event input device may detect an actual hazard event occurring in the facility. In the event the second user at the control panel misinterprets the signal from the second event input device as being tested by the first user, the hazard event occurring in the facility may be missed. Such an instance could lead to injury to occupants of the facility.

In addition to the likelihood of a missed hazard event, this process of manually testing each event input device can be time consuming, expensive, and disruptive to occupants of a facility being tested. For example, a user such as a maintenance engineer is often required to access event input devices which are situated in areas occupied by other facility occupants or parts of facilities that are often difficult to access (e.g., elevator shafts, high ceilings, ceiling voids, etc.). As such, the maintenance engineer may take several days and/or several visits to complete testing of the event input devices, particularly at a large facility. Additionally, some event input devices may not be tested because of access issues.

Event input device testing according to the present disclosure can allow for self-testing procedures and analysis for event input devices in a facility. Such an approach can automate the testing process for event input devices in a facility while allowing event input devices which are not being tested to remain in an active mode for hazard event detection. In an event in which an event input device not being tested detects a hazard event, a user can be alerted which can ensure a hazard event is not missed. Further, such an approach can prevent having multiple users testing the alarm system. Accordingly, a user may initiate a test of the alarm system in a facility without disruption to other occupants of the facility and ensure testing of all of the event input devices included in the facility in a shorter time frame as compared with previous approaches.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1, and a similar element may be referenced as 202 in FIG. 2.

As used herein, "a", "an", or "a number of" something can refer to one or more such things, while "a plurality of" something can refer to more than one such things. For example, "a number of components" can refer to one or more components, while "a plurality of components" can refer to more than one component.

Figure 1:
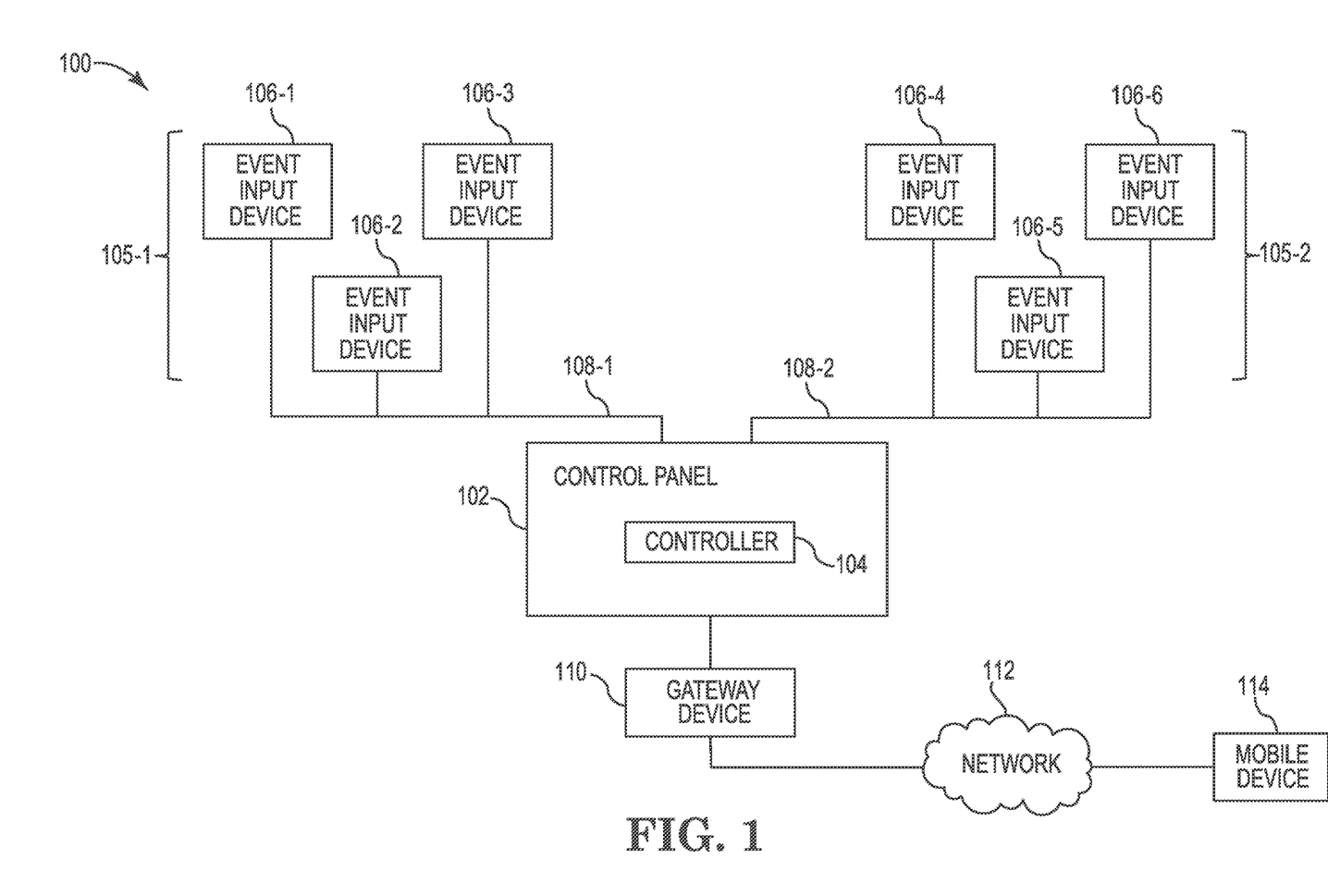
FIG. 1 is an example of a system for event input device testing, in accordance with one or more embodiments of the present disclosure.

FIG. 1 is an example of a system 100 for event input device testing, in accordance with one or more embodiments of the present disclosure. The system 100 can include a control panel 102, a first group 105-1 of event input devices 106-1, 106-2, 106-3, a second group 105-2 of event input devices 106-4, 106-5, 106-6, a gateway device 110, a network 112, and a mobile device 114. The control panel 102 can include a controller 104.

As illustrated in FIG. 1, the control panel 102 can include the controller 104. As used herein, the term "control panel" refers to a device to control components of an alarm system of a facility. For example, the control panel 102 can be a fire control panel that can receive information from event input devices 106-1, 106-2, 106-3, 106-4, 106-5, 106-6 (referred to collectively herein as event input devices 106) and determine whether a hazard event is occurring or has occurred.

The control panel 102 can be connected to the event input devices 106. As used herein, the term "event input device" refers to a device that can receive an input relating to an event. Such an event can be, for instance, a hazard event such as a fire. For example, an event input device can receive an input relating to a fire occurring in the facility. Such event input devices 106 can be a part of an alarm system of the facility and can include devices such as fire sensors, such as smoke detectors, heat detectors, carbon monoxide (CO) detectors, or combinations of these three; interfaces; pull stations; input/output modules; aspirating units; and/or audio/visual devices, among other types of event input devices.

These event input devices 106 can be automatic, self-test devices, such as smoke detectors, heat detectors, CO detectors, and/or others. Such self-test devices can include mechanisms that generate aerosols, heat, carbon monoxide, etc. and sense these items as appropriate to the type of device being tested in the device to test the performance of the device. This can, for example, be to test the event input device's thermal and/or photo sensing capabilities.

Such event input devices 106 can be included in groups. For example, event input devices 106-1, 106-2, 106-3 can be included in a first group 105-1 of event input devices and event input devices 106-4, 106-5, 106-6 can be included in a second group 105-2 of event input devices. Although illustrated in FIG. 1 as including three event input devices 106, such groups 105-1, 105-2 can include more or less than three event input devices 106.

The control panel 102 can be connected to the groups 105-1, 105-2 of event input devices 106 via alarm loop 108-1, 108-2, respectively. As used herein, the term "alarm loop" refers to a communication medium between a control panel and a event input device that carries power and signals between the control panel and the event input device. Such a communication medium can, in some instances, include a pair of wires to carry signals and/or power to and/or from event input devices 106 to control panel 102. The alarm loops 108-1, 108-2 can be configured according to regulations and/or guidelines for alarm systems.

As illustrated in FIG. 1, the first group 105-1 of event input devices 106-1, 106-2, 106-3 can be connected to the control panel 102 via alarm loop 108-1. Additionally, the second group 105-2 of event input devices 106-4, 106-5, 106-6 can be connected to the control panel 102 via alarm loop 108-2. The controller 104 can cause the first group 105-1 and/or the second group 105-2 of event input devices 106 to perform an automated test analysis, as is further described herein.

The controller 104 can cause event input devices 106 to perform an automated test analysis according to a predetermined test sequence. For example, the event input devices 106 can perform an automated test analysis in a pre-determined order of devices. For instance, the pre-determined test sequence of the group 105-1 of event input devices 106 can begin with event input device 106-1 performing an automated test process, followed by event input device 106-2, then event input device 106-3. Further, the pre-determined test sequence of the group 105-2 of event input devices 106 can begin with event input device 106-4, event input device 106-5, and finally event input device 106-6. Such an automated test analysis performed according to the pre-determined test sequence can allow the controller 104 to determine whether a hazard event has or is occurring in the facility if one of the event input devices 106 detects a hazard event out of order of the test sequence, as is further described herein.

The controller 104 can cause a first event input device 106-1 of a group (e.g., the first group 105-1) of event input devices to perform an automated test process. As described above, event input devices 106 can be self-test devices that can perform an automated test process such that an event input device (e.g., event input device 106-1) can test its own sensing capabilities. For example, event input device 106-1 can be a smoke detector. The event input device 106-1 can further include a mechanism to generate an aerosol such that a sensor on the event input device 106-1 can detect the aerosol to determine if the event input device 106-1 is functioning properly (e.g., is properly detecting smoke).

The event input device 106-1 can be in a test mode during its automated test process. As used herein, the term "test mode" refers to a mode of operation of an event input device in which the event input device tests its own sensor(s) to determine whether it is functioning properly. While the event input device 106-1 is in the test mode during its automated test process, the remaining event input devices of the group 105-1 can be in an active mode. As used herein, the term "active mode" refers to a mode of operation of an event input device in which its sensor(s) are functioning to detect a hazard event. For example, during the automated test process of the event input device 106-1, event input devices 106-2 and 106-3 (e.g., of the first group 105-1) can be in an active mode.

The controller 104 can determine whether any remaining event input devices 106-2, 106-3 of the group 105-1 of event input devices have detected a hazard event. For example, the remaining event input devices 106-2, 106-3 can be in an active mode to detect whether any hazard events have or are occurring. For example, event input device 106-2 can be a heat detector and can detect for heat that may indicate a hazard event.

In some examples, the controller 104 can determine, via the alarm loop 108-1, whether any of the remaining event input devices 106-2, 106-3 have detected a hazard event after the first event input device 106-1 has performed its automated test process. For example, the controller 104 may wait for the event input device 106-1 to perform its automated test process, and upon completion, determine whether event input devices 106-2, 106-3 have detected a hazard event. Such intermittent alarm loop 108 communication may be as a result of regulations and/or guidelines applicable to the location of the facility including the system 100.

In some examples, the controller 104 can determine, via the alarm loop 108-1, whether any of the remaining event input devices 106-2, 106-3 have detected a hazard event while the first event input device 106-1 is performing its automated test process. For example, the controller 104 may determine, during the automated test process of event input device 106-1, whether event input devices 106-2, 106-3 have detected a hazard event. Such continuous alarm loop 108 communication can ensure a hazard event is not missed in the facility even during testing procedures of the event input devices 106.

According to the predetermined test sequence, the controller 104 can cause the next event input device 106 to perform an automated test process. The controller 104 can cause the second event input device 106-2 of the group 105-1 of event input devices to perform an automated test process in response to the first event input device 106-1 passing the automated test process and determining none of the other event input devices 106-2, 106-3 have detected a hazard event. For example, in response to determining that neither event input device 106-2 or 106-3 have detected a hazard event and event input device 106-1 passing its automated test process, the controller 104 can cause event input device 106-2 to perform an automated test process.

For example, event input device 106-2 can be a heat detector. The event input device 106-2 can further include a mechanism to generate heat such that a sensor on the event input device 106-2 can detect the generated heat to determine if the event input device 106-2 is functioning properly (e.g., is properly detecting heat). The event input device 106-2 can be in a test mode during its automated test process, and the remaining event input devices 106-1, 106-3 in the group 105-1 of event input devices can be in an active mode.

The controller 104 can determine whether any remaining event input devices 106-1, 106-3 of the group 105-1 of event input devices have detected a hazard event. For example, the remaining event input devices 106-1, 106-3 can be in the active mode to detect whether any hazard events have or are occurring.

In response to the second event input device 106-2 passing its automated test process and in response to determining that neither event input device 106-1 or 106-3 have detected a hazard event, the controller 104 can cause the next event input device 106-3 to perform an automated test process. For example, according to the predetermined test sequence, the controller 104 can cause the event input device 106-3 to perform an automated test process (e.g., while in a test mode) while event input devices 106-1, 106-2 are in an active mode. Controller 104 can further determine whether event input devices 106-1, 106-2 have detected a hazard event. In such a way, the controller 104 can cause groups 105 of event input devices 106 to perform automated test processes while also detecting for hazard events in a facility.

While the controller 104 is described above as causing the group 105-1 of event input devices 106 to perform automated test processes while detecting for hazard events, embodiments of the present disclosure are not so limited. For example, the controller 104 can further cause the group 105-2 of event input devices 106 to perform automated test processes while detecting for hazard events. The controller 104 can cause the group 105-1 of event input devices 106 to perform automated test processes while detecting for hazard events simultaneously with the group 105-2 or separately.

As described above, if any of the remaining event input devices 106 do not detect a hazard event while a event input device 106 is in a test mode performing an automated test analysis, the controller 104 can continue testing the event input devices 106 according to the predetermined test sequence. However, if any of the remaining event input devices 106 detect a hazard event while an event input device 106 is in the test mode performing the automated test analysis, an alarm can be generated as is further described herein.

For example, event input device 106-1 can be in a test mode performing an automated test analysis. The controller 104 can determine whether any of the remaining event input devices 106-2, 106-3 have detected a hazard event. In an example in which event input device 106-2 detects a hazard event (e.g., after or during the automated test analysis of event input device 106-1), the controller 104 can generate an alarm. The controller 104 can distinguish between the detection of a hazard event from the self-test of event input device 106-1 and the detection of a real hazard event by event input device 106-2 as event input device 106-2 has detected a hazard event out of order of the predetermined test sequence. For example, while the event input device 106-1 detects smoke (e.g., as a result of the self-test of event input device 106-1 in which the event input device 106-1 generates smoke), the event input device 106-2 may detect heat which can indicate a real hazard event (e.g., a fire) occurring in the facility. Accordingly, the controller 104 can determine that event input device 106-2 has detected a hazard event and in response can generate an alarm.

In response to the event input device 106-2 detecting the hazard event, the controller 104 can cease the self-test procedure of the event input device 106-1. The event input device 106-1 can revert from a test mode to an active mode to detect for hazard events (e.g., smoke that may be associated with a fire).

As illustrated in FIG. 1, the control panel 102 can be connected to a mobile device 114 via a gateway device 110 and a network 112. As used herein, a mobile device can include devices that are (or can be) carried and/or worn by the user. Mobile device 114 can be a phone (e.g., a smart phone), a tablet, a personal digital assistant (PDA), smart glasses, and/or a wrist-worn device (e.g., a smart watch), among other types of mobile devices. As used herein, the term "gateway device" refers to a device to provide an interface between the control panel 102 and other devices.

The mobile device 114 can be connected to the gateway device 110 via a network 112. For example, the network 112 can provide for a network relationship between the mobile device 114 and the gateway device 110/control panel 102. Such a network relationship can be a wired or wireless network connection. Examples of such a network relationship can include a local area network (LAN), wide area network (WAN), personal area network (PAN), a distributed computing environment (e.g., a cloud computing environment), storage area network (SAN), Metropolitan area network (MAN), a cellular communications network, Long Term Evolution (LTE), visible light communication (VLC), Bluetooth, Worldwide Interoperability for Microwave Access (WiMAX), Near Field Communication (NFC), infrared (IR) communication, Public Switched Telephone Network (PSTN), radio waves, and/or the Internet, among other types of network relationships.

The controller 104 can transmit a notification of the alarm from the control panel 102 to the mobile device 114 via the gateway device 110. The notification of the alarm can be transmitted to alert a user of the mobile device 114 of the hazard event occurring in the facility. The user of the mobile device 114 can accordingly take action to mitigate the hazard event, such as alerting other personnel or the hazard event, alerting first responders to the hazard event, evacuating the facility, etc.

Although not illustrated in FIG. 1 for clarity and so as not to obscure embodiments of the present disclosure, the control panel 102 can further include a user interface. The user interface can display the automated test analysis. For example, the user interface of the control panel 102 can display the progress of the automated test analysis, the results of the automated test analysis (e.g., which event input devices 106 passed their self-tests, which event input devices 106 failed their self-tests, etc.), among other information, as is further described in connection with FIGS. 2 and 3.

The automated test analysis can further be transmitted to the mobile device 114. For example, the results of the automated test analysis, the progress of the automated test analysis, etc. may be transmitted to the mobile device 114 such that a user of the mobile device 114 can monitor the automated test analysis of the event input devices 106 remotely (e.g., from the control panel 102). Automated self-testing of the event input devices 106 can, accordingly, be initiated from a remote location (e.g., relative to the control panel 102) and be monitored by a user via the mobile device 114. Through such testing, event input devices can be tested more quickly while simultaneously sensing for hazard events, whereas prior approaches included multiple users bringing testing equipment to each device and testing them one at a time, where all of the event input devices would be in test mode such that a hazard event may be missed during testing. As such, event input device testing according to the present disclosure can allow for self-testing to be accomplished without putting all of the event input devices in a test mode. Accordingly, users and/or facility occupants may still be warned of a hazard event while event input device testing is taking place, providing a safer approach to event input device testing as opposed to previous approaches.

Figure 2:
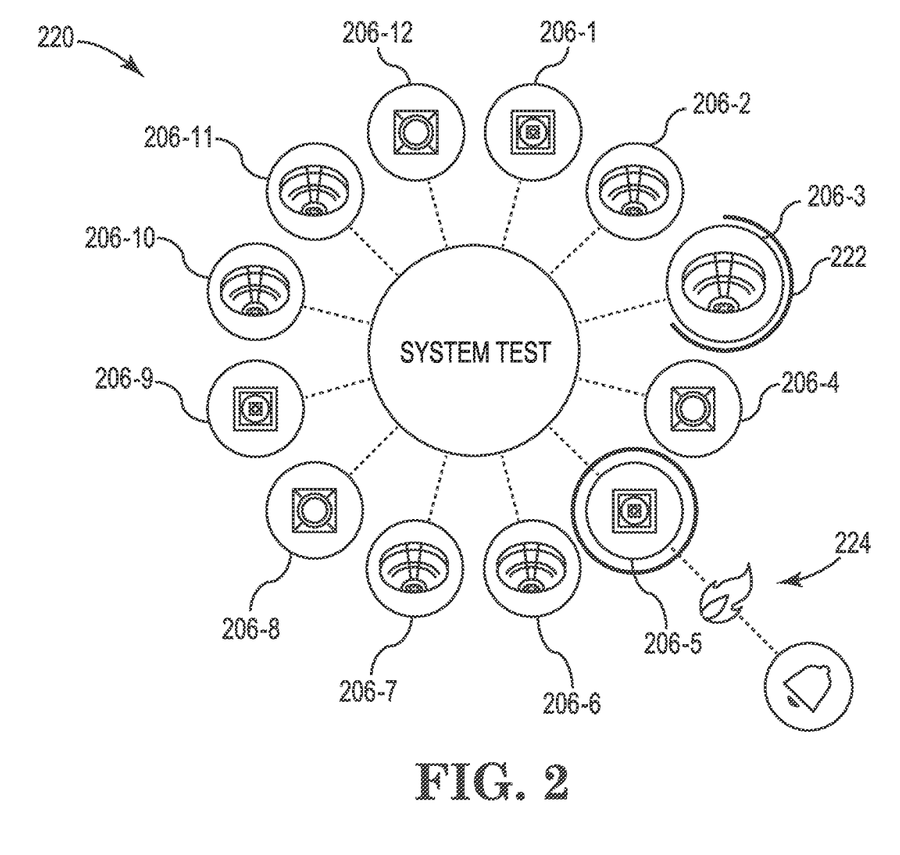
FIG. 2 is an illustration of a display provided on a user interface showing an automated test analysis, generated in accordance with one or more embodiments of the present disclosure.

FIG. 2 is an illustration of a display provided on a user interface showing an automated test analysis, generated in accordance with one or more embodiments of the present disclosure. The automated test analysis can include progress 220 of automated test analysis for event input devices 206-1 through 206-12 and progress 222 of automated test process of event input device 206-3.

As illustrated in FIG. 2, an automated test analysis can be taking place that can include a group of event input devices 206-1, 206-2, 206-3, 206-4, 206-5, 206-6, 206-7, 206-8, 206-9, 206-10, 206-11, and 206-12. The automated test analysis can be performed according to a predetermined test sequence. For example, event input devices 206-1, 206-2, 206-3, 206-4, 206-5, 206-6, 206-7, 206-8, 206-9, 206-10, 206-11, and 206-12 can perform automated test processes according to a predetermined test sequence. The predetermined test sequence can be, for example, event input devices 206-1, 206-2, 206-3, 206-4, 206-5, 206-6, 206-7, 206-8, 206-9, 206-10, 206-11, and 206-12.

Displaying the automated test analysis can include displaying progress 220 of the automated test analysis. The progress 220 of the automated test analysis can be displayed via a user interface of a control panel. The progress 220 indicates that the automated test analysis is up to an automated test process for event input device 206-3. Event input devices 206-1 and 206-2 have passed their automated test processes and based on the predetermined test sequence, event input device 206-3 is being tested per the test sequence. Event input devices 206-4 through 206-12 have yet to be tested.

Additionally, displaying the automated test analysis can include displaying progress 222 of the event input device 206-3 of the group of event input devices 206 that is performing an automated test process. As illustrated in FIG. 2, the user interface of the control panel can display the progress 222 of the automated test process of event input device 206-3. Event input device 206-3 can be, for example, a smoke alarm that is performing an automated test process that is nearly ⅔ completed.

As per the predetermined test sequence, the controller of the control panel would expect the next event input device to perform an automated test process to be event input device 206-4. However, as illustrated in FIG. 2, the loop communication system connecting the event input devices to the control panel has communicated information to the control panel that event input device 206-5 (e.g., a pull station) has detected a hazard event. For example, someone in the facility may have pulled the pull station of event input device 206-5 as a result of a hazard event occurring (e.g., a fire). Accordingly, since event input device 206-5 has detected a hazard event outside of the order of the predetermined test sequence, the controller of the control panel can distinguish the hazard event detected by the event input device 206-5 to be a real hazard event (e.g., as opposed to a hazard event detected as a result of an automated test process performed by an event input device). Accordingly, the controller can generate an alarm 224 and the user interface can display the alarm 224. Further, the controller can generate a notification of the alarm 224 and transmit the notification to a mobile device, as previously described in connection with FIG. 1.

Figure 3:
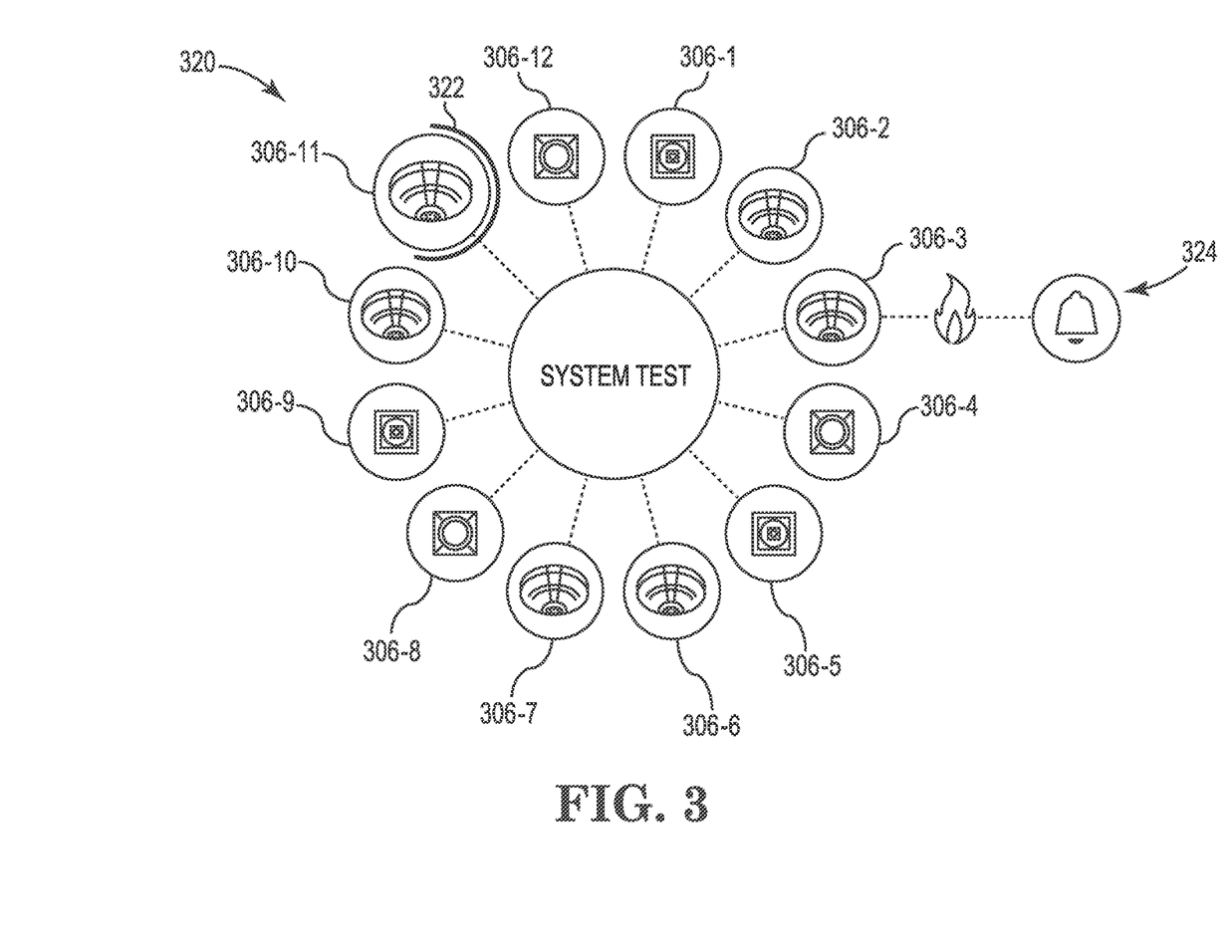
FIG. 3 is an illustration of a display provided on a user interface showing an automated test analysis, generated in accordance with one or more embodiments of the present disclosure.

FIG. 3 is an illustration of a display provided on a user interface showing an automated test analysis, generated in accordance with one or more embodiments of the present disclosure. The automated test analysis can include progress 320 of automated test analysis for event input devices 306-1 through 306-12 and progress 322 of automated test process of event input device 306-11.

As illustrated in FIG. 3, an automated test analysis can be taking place that can include a group of event input devices 306-1, 306-2, 306-3, 306-4, 306-5, 306-6, 306-7, 306-8, 306-9, 306-10, 306-11, and 306-12. The automated test analysis can be performed according to a predetermined test sequence. For example, event input devices 306-1, 306-2, 306-3, 306-4, 306-5, 306-6, 306-7, 306-8, 306-9, 306-10, 306-11, and 306-12 can perform automated test processes according to a predetermined test sequence. The predetermined test sequence can be, for example, event input devices 306-1, 306-2, 306-3, 306-4, 306-5, 306-6, 306-7, 306-8, 306-9, 306-10, 306-11, and 306-12.

As previously described in connection with FIG. 2, displaying the automated test analysis can include displaying progress 320 of the automated test analysis via a user interface of a control panel. The progress 320 can indicate that the automated test analysis is up to an automated test process for event input device 306-11, where event input devices 306-1 through 306-10 have passed their automated test processes and event input device 306-12 has yet to be tested. The progress 322 of the automated test process for event input device 306-11 can additionally be displayed.

As per the predetermined test sequence, the controller of the control panel would expect the next event input device to perform an automated test process to be event input device 306-12. However, as illustrated in FIG. 3, the loop communication system connecting the event input devices to the control panel has communicated information to the control panel that event input device 306-3 (e.g., a smoke alarm) has detected a hazard event. Accordingly, since event input device 306-3 has detected a hazard event outside of the order of the predetermined test sequence, the controller of the control panel can distinguish the hazard event detected by the event input device 306-3 to be a real hazard event (e.g., as opposed to a hazard event detected as a result of an automated test process performed by a event input device). Accordingly, the controller can generate an alarm 324 and the user interface can display the alarm 324. Further, the controller can generate a notification of the alarm 324 and transmit the notification to a mobile device, as previously described in connection with FIG. 1.

Figure 4:
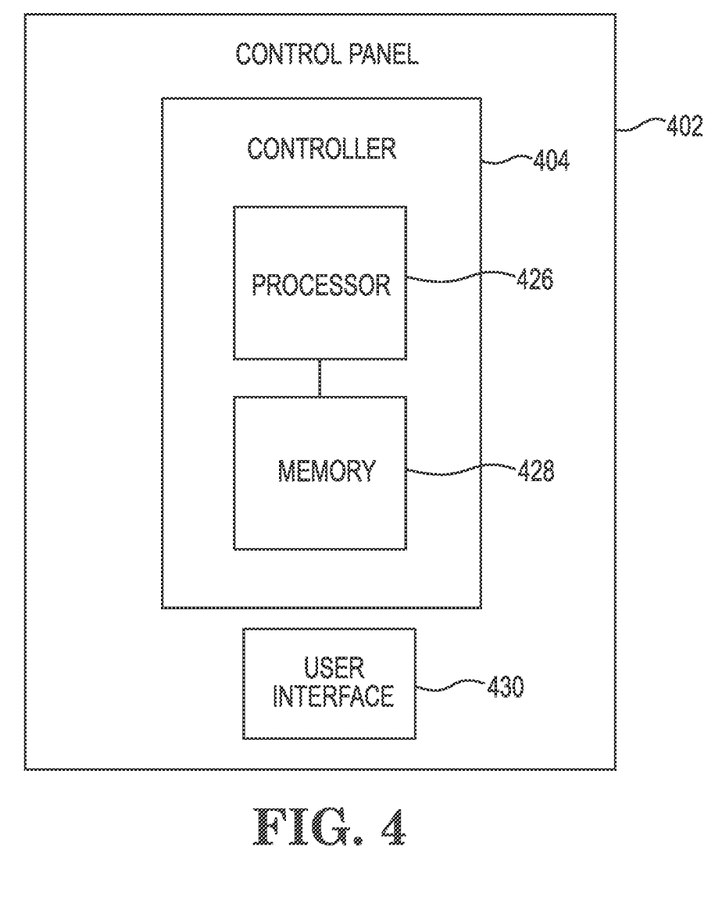
FIG. 4 is an example of a control panel for event input device testing, in accordance with one or more embodiments of the present disclosure.

FIG. 4 is an example of a control panel 402 for event input device testing, in accordance with one or more embodiments of the present disclosure. As illustrated in FIG. 4, the control panel 402 can include a controller 404 and a user interface 430. The controller 404 can include a memory 428 and a processor 426 for event input device testing in accordance with the present disclosure.

The memory 428 can be any type of storage medium that can be accessed by the processor 426 to perform various examples of the present disclosure. For example, the memory 428 can be a non-transitory computer readable medium having computer readable instructions (e.g., executable instructions/computer program instructions) stored thereon that are executable by the processor 426 for event input device testing in accordance with the present disclosure. The computer readable instructions can be executable by the processor 426 to redundantly generate an automated test analysis for event input device testing.

The memory 428 can be volatile or nonvolatile memory. The memory 428 can also be removable (e.g., portable) memory, or non-removable (e.g., internal) memory. For example, the memory 428 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical storage, and/or a magnetic medium such as magnetic cassettes, tapes, or disks, among other types of memory.

Further, although memory 428 is illustrated as being located within controller 404, embodiments of the present disclosure are not so limited. For example, memory 428 can also be located internal to another computing resource (e.g., enabling computer readable instructions to be downloaded over the Internet or another wired or wireless connection).

As illustrated in FIG. 4, control panel 402 includes a user interface 430. For example, the user interface 430 can display an automated test analysis including progress of the automated test analysis, progress of an automated test process of an event input device, and/or alarms for event input device testing (e.g., as previously described in connection with FIGS. 1-3) in a single integrated display. A user (e.g., operator) of control panel 402 can interact with control panel 402 via user interface 430. For example, user interface 430 can provide (e.g., display and/or present) information to the user of control panel 402, and/or receive information from (e.g., input by) the user of control panel 402. For instance, in some embodiments, user interface 430 can be a graphical user interface (GUI) that can provide and/or receive information to and/or from the user of control panel 402. The display can be, for instance, a touch-screen (e.g., the GUI can include touch-screen capabilities). Alternatively, a display can include a television, computer monitor, mobile device screen, other type of display device, or any combination thereof, connected to control panel 402 and configured to receive a video signal output from the control panel 402.

As an additional example, user interface 430 can include a keyboard and/or mouse the user can use to input information into control panel 402. Embodiments of the present disclosure, however, are not limited to a particular type(s) of user interface.

User interface 430 can be localized to any language. For example, user interface 430 can display the airfield workflow management in any language, such as English, Spanish, German, French, Mandarin, Arabic, Japanese, Hindi, etc.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A controller for event input device testing, comprising:
   a memory; and
   a processor configured to execute executable instructions stored in the memory to:
   cause a first event input device of a group of event input devices to perform an automated test process according to a predetermined test sequence defining a pre-determined testing order of event input devices included in the group of event input devices;
   determine whether a second event input device of the group of event input devices has detected a hazard event while the first event input device is performing the automated test process;
   cause, according to the predetermined test sequence, the second event input device to perform an automated test process in response to:
   the first event input device passing its automated test process; and
   determining the second input device has not detected a hazard event during the automated test process of the first event input device; and
   determine whether the first event input device has detected a hazard event while the second event input device is performing the automated test process.

2. The controller of claim 1, wherein the processor is configured to execute the executable instructions to cause an alarm to be generated in response to determining the second event input device has detected a hazard event.

3. The controller of claim 1, wherein the processor is configured to execute the executable instructions to cause an alarm to be generated in response to determining the first event input device has detected a hazard event.

4. The controller of claim 1, wherein the processor is configured to execute the executable instructions to cease the automated test process of the first event input device in response to the second event input device detecting the hazard event.

5. A system for event input device testing, comprising:
a group of event input devices; and
a control panel including a controller configured to cause the group of event input devices to perform an automated test analysis according to a predetermined test sequence defining a pre-determined testing order of event input devices included in the group of event input devices by:
causing a first event input device of the group of event input devices to perform an automated test process according to the predetermined test sequence;
determining whether any remaining event input devices of the group of event input devices have detected a hazard event;
generating an alarm in response to determining any of the remaining event input devices have detected a hazard event;
causing a second event input device of the group of event input devices to perform an automated test process according to the predetermined test sequence in response to:
the first event input device passing its automated test process; and
determining the second event input device has not detected a hazard event during the automated test process of the first event input device; and
determining whether the first event input device has detected a hazard event while the second event input device is performing the automated test process.

6. The system of claim 5, wherein the first event input device is in a test mode during the automated test process of the first event input device.

7. The system of claim 5, wherein the remaining event input devices are in an active mode during the automated test process of the first event input device.

8. The system of claim 5, wherein the control panel comprises a user interface configured to display the automated test analysis.

9. The system of claim 5, wherein the controller is configured to transmit a notification of the alarm from the control panel to a mobile device via a gateway device.

10. The system of claim 5, wherein the control panel is connected to the group of event input devices via an alarm loop.

11. The system of claim 10, wherein the controller is configured to determine, via the alarm loop, whether any of the remaining event input devices have detected a hazard event after the first event input device has performed the automated test process.

12. The system of claim 10, wherein the controller is configured to determine, via the alarm loop, whether any of the remaining event input devices have detected a hazard event while the first event input device is performing the automated test process.

13. A computer implemented method for event input device testing, comprising:
performing, by a controller included in a control panel, an automated test analysis on a group of event input devices according to a predetermined test sequence defining a pre-determined testing order of event input devices included in the group of event input devices by:
causing a first event input device of the group of event input devices to perform an automated test process while in a test mode according to the predetermined test sequence;
determining whether any remaining event input devices of the group of event input devices have detected a hazard event while the first event input device is performing the automated test process;
causing a second event input device of the group of event input devices to perform an automated test process according to the predetermined test sequence in response to:
the first event input device passing its automated test process; and
determining the second event input device has not detected a hazard event during the automated test process of the first event input device; and
determining whether the first event input device has detected a hazard event while the second event input device is performing the automated test process;
displaying, on a user interface of the control panel, the automated test analysis.

14. The method of claim 13, wherein the method includes causing, by the controller, each event input device of the group of event input devices to perform an automated test process according to the predetermined test sequence.

15. The method of claim 13, wherein displaying the automated test analysis includes displaying at least one of:
progress of the automated test analysis of the first event input device and of the second event input device; and
progress of an event input device of the group of event input devices that is performing an automated test process.

16. The method of claim 13, wherein the method includes transmitting, by the controller, the automated test analysis of the first event input device and the automated test analysis of the second event input device to a mobile device.

17. The method of claim 13, wherein the method includes generating, by the controller, an alarm in response to determining any of the remaining event input devices of the group of event input devices have detected a hazard while the first event input device is performing the automated test process.

18. The method of claim 17, wherein the method includes transmitting, by the controller, a notification of the alarm to a mobile device.

19. The method of claim 13, wherein the method includes causing the first event input device to perform the automated test process by causing the first event input device to:
generate an aerosol; and
detect, via a sensor on the first event device, the generated aerosol.

20. The method of claim 13, wherein the method includes causing the second event input device to perform the automated test process by causing the second event input device to:
generate heat; and
detect, via a sensor on the second event device, the generated heat.

* * * * *